US006993748B2

(12) United States Patent
Schaefer

(10) Patent No.: US 6,993,748 B2
(45) Date of Patent: Jan. 31, 2006

(54) SYSTEMS AND METHODS FOR TABLE DRIVEN AUTOMATION TESTING OF SOFTWARE PROGRAMS

(75) Inventor: James S. Schaefer, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 593 days.

(21) Appl. No.: 09/983,884

(22) Filed: Oct. 26, 2001

(65) Prior Publication Data

US 2003/0084429 A1 May 1, 2003

(51) Int. Cl.
*G06F 9/44* (2006.01)
(52) U.S. Cl. .......................... 717/124; 717/126; 707/3; 707/4; 714/38; 715/509
(58) Field of Classification Search ........ 717/124–127, 717/131–132, 155, 101, 126; 709/227; 714/33, 38; 345/705; 715/509; 707/3, 4
See application file for complete search history.

(56) References Cited

U.S. PATENT DOCUMENTS

| 5,448,740 | A | * | 9/1995 | Kiri et al. .................... 717/155 |
|---|---|---|---|---|
| 5,553,235 | A | * | 9/1996 | Chen et al. .................... 714/20 |
| 5,754,860 | A | * | 5/1998 | McKeeman et al. ........ 717/124 |
| 5,892,510 | A | | 4/1999 | Lau et al. |
| 5,892,949 | A | * | 4/1999 | Noble ......................... 717/125 |
| 5,905,856 | A | * | 5/1999 | Ottensooser ................. 714/38 |
| 5,982,365 | A | * | 11/1999 | Garcia et al. ............... 345/705 |
| 6,002,869 | A | * | 12/1999 | Hinckley ..................... 717/124 |
| 6,360,268 | B1 | * | 3/2002 | Silva et al. .................. 709/227 |
| 6,401,220 | B1 | * | 6/2002 | Grey et al. ................... 714/33 |
| 6,671,875 | B1 | * | 12/2003 | Lindsey et al. ............. 717/129 |
| 6,694,321 | B1 | * | 2/2004 | Berno ......................... 707/101 |
| 6,725,399 | B1 | * | 4/2004 | Bowman ...................... 714/38 |
| 6,748,583 | B2 | * | 6/2004 | Aizenbud-Reshef et al. ............... 717/127 |
| 6,760,721 | B1 | * | 7/2004 | Chasen et al. ................. 707/3 |

FOREIGN PATENT DOCUMENTS

| EP | 0 660 235 A1 | 6/1995 |
|---|---|---|
| WO | WO 01/16753 A2 | 3/2001 |
| WO | WO 01/57651 A2 | 8/2001 |
| WO | WO 01/57706 A2 | 8/2001 |

OTHER PUBLICATIONS

Microsoft Press Computer Dictionary, Third Edition, published on 1997 (p. 162 and p. 212).*
TITLE: Implementing a Relational Database for an Accelerated-Life-Test Facility, author: Russell R. Barton, IEEE, 1994.*
TITLE: Informal Usability Testing: A Strategy for User Involvement, author: Haramudanis, ACM, 1992.*
TITLE: Semantic Database Mapping in EUFID, author: Burger, ACM, 1980.*
WinRunner by Mercury Interactive Corporation, pp. 1-8 (www.mercuryinteractive.com) printed from Web on Oct. 26, 2001.

(Continued)

*Primary Examiner*—Ohameli C. Das
(74) *Attorney, Agent, or Firm*—Finnegan, Henderson, Farabow, Garrett & Dunner, L.L.P.

(57) ABSTRACT

A table driven test automation system for performing functional testing of a software program. The system may include a GUI translator component to translate one or more GUI maps into a set of database tables, a data input component to facilitate entry and editing of test case data in the tables, and a test engine component for executing the software program based on a test case stored in the tables.

5 Claims, 21 Drawing Sheets

OTHER PUBLICATIONS

Ostrand, T., et al., "A Visual Test Development Environment for GUI Systems," Software Engineering Notes, Association for Computing Machinery, vol. 23, No. 2, Mar. 1, 1998, XP-000740949, ISSN: 0163-5948, pp. 82-92.

Okada, H., et al., "GUITESTER: A Log-Based Usability Testing Tool for Graphical User Interfaces," IEICE Transactions on Information and Systems, Institute of Electronics Information and Comm. Eng. Tokyo, JP, vol. E82-D, No. 6, Jun. 1999, XP-000849324, ISSN: 0916-8532, pp. 1030-1040.

Nolan, C., "A Look at e-Test Suite 3.1 by RSW," www.stgemagazine.com, Jul./Aug. 1999, XP-002155308, pp. 60-61.

* cited by examiner

```
"Flight Reservation":
{
    class: window,
    MSW_class: "†Afx:.*",                    400
    label: "Flight Reservation"
},:
    rtree_state: open,
    ltree_state: open
},:
"Flight Reservation"."Date of Flight:":
{
    class: edit,                              410
    attached_text: "Date of Flight:"
},:
"Flight Reservation".FLIGHT:
{
    class: object,
    label: FLIGHT,                            420
    MSW_class: Button
},:
"Flight Reservation"."Fly From:":
{
    class: list,                              430
    attached_text: "Fly From:"
},:
"Flight Reservation"."Fly To:":
{
    class: list,                              440
    attached_text: "Fly To:"
},:
```

FIGURE 4

500 — 
```
ABCD_LLP:
{
class: window,
html_name: home,
MSW_class: html_frame
}
{
rtree_state: open,
ltree_state: open
}
```

510 —
```
ABCD_LLP."Employee Profiles":
{
class: object,
MSW_class: html_rect,
html_name: "att.gif"
}
```

520 —
```
ABCD_LLP."Contact Us":
{
class: object,
MSW_class: html_rect,
html_name: "cont.gif"
}
```

530 —
```
ABCD_LLP.Disclaimer:
{
class: object,
MSW_class: html_text_link,
html_name: disclaimer
}
```

540 —
```
ABCD_LLP."E Media C":
{
class: object,
MSW_class: html_text_link,
html_name: "e-media-c"
}
```

550 —
```
ABCD_LLP."IP Resources":
{
class: object,
MSW_class: html_rect,
html_name: "ip.gif"
}
```

560 —
```
ABCD_LLP."Publications and Case Summaries":
{
class: object,
MSW_class: html_rect,
html_name: "pubs.gif"
}
```

570 —
```
ABCD_LLP.Recruiting:
{
class: object,
MSW_class: html_rect,
html_name: "rec.gif"
}
```

FIGURE 5

| FUNCTION_PROTOTYPE |
|---|
| Print_Screen() |
| Seize_Data() |
| Verify_Text(Page,Row,Col,Text) |
| . . . . |

PAGE_ABBR Table

| ABBR_NAME | FULL_NAME |
|---|---|
| FR | Flight Reservation |
| FT | Flights Table |
| LW | Login Window |

810a → ABBR_NAME column
820a → FULL_NAME column

PAGE_FLOW Table

800b

| TD_ID | FLOW_ID | RUN_COUNT | FLOW_DESC | LAUNCH_APPL |
|---|---|---|---|---|
| 1 | 1 | 1 | Denver_LosAng | CLIENT("C:\Program |
| 2 | 2 | 0 | Denver_Paris | CLIENT("C:\Program |
| 3 | 3 | 0 | Denver_Port | CLIENT("C:\Program |

810b — 820b — 830b — 840b — 850b

Alpha Section

Page Sequence Section

| PAGE_1 | PAGE_2 | PAGE_3 | ... | PAGE_10 | PAGE_11 | PAGE_12 |
|---|---|---|---|---|---|---|
| | | | | | | |

Seized Data Table (SD_FR)

800d

| TD_ID | FLOW_ID | PAGE_ID | PAGE_ABBR | TimeStart | TimeStop | VerifyObject |
|---|---|---|---|---|---|---|
| (810d) | (815d) 1 | (820d) PAGE_1 | (825d) FR | (830d) | (835d) | (840d) |

Alpha Section (815d–840d)

| Date of Flight | Fly From | Fly To |
|---|---|---|
| (845d) X | (850d) X | (855d) X |

Seized Data Section

```
# *****************************************
#    GUI ENGINE CONSTANTS
public NoDupExists=0;
public WinIncNum1=0; # This variable is used to increament window name if dups exist.
  public PageFlow[ ] = {
    {"TD_ID", "50"},
    {"FLOW_ID", "10"},
    {"RUN_STATUS", "I"},
    {"FLOW_DESC","100"},
    {"LAUNCH_APP", "150"},
    {"PAGE_1", "50"},
    {"PAGE_2", "50"},
    {"PAGE_3", "50"},
    {"PAGE_4", "50"},
    {"PAGE_5", "50"},
    {"PAGE_6", "50"},
    {"PAGE_7", "50"},
    {"PAGE_8", "50"},
    {"PAGE_9", "50"},
    {"PAGE_10", "50"},
    {"PAGE_11", "50"},
    {"PAGE_12", "50"}
};

public PageAbbr[ ] = {
  {"ABBR_NAME", "100"},
  {"FULL_NAME", "100"}
};
```

```
function CreatePageFlowTable()
{
        auto rc_db,i,j,tablestub,rc,tablecol;

rc_db=db_connect("CreateTable","DBQ=C:\\Ent_Automation\\Databases\\MasterDB.mdb;DefaultDir=C:\\
Ent_Automation\\Databases;Driver={Microsoft Access Driver (*.mdb)};DriverId=281;FIL=MS Access;FILEDSN=C:\\
Program Files\\Common Files\\ODBC\\DataSources\\AUTO_DB;MaxBufferSize=2048;MaxScanR");

# Initializing variable
        i=0;
        # Reading from constant file to create PAGE_FLOW table.
        while ( PageFlow[i,0] != "" )
    {
      if (i == 0 )
      {
        tablestub=create_table_stub("CreateTable", "PAGE_FLOW", PageFlow[i,0], PageFlow[i,1]);
           i++;
           if (tablestub != 0)
           {
                   tl_step("Table Stub",FAIL,"Could not create \"PAGE_FLOW \"table. Either table already exists or
function \"create_table_stub\" did not work properly");
                   pause("Failed to create \" PAGE_FLOW \" table, Either table already exists or function \
"create_table_stub\" did not work properly");
                   rc=db_disconnect("CreateTable");
                   texit;
             } # End of "if (tablestub!=0)"
      }   # End of "if (i == 0 )"
      else
      {
         tablecol=add_table_col ("CreateTable", "PAGE_FLOW", PageFlow[i,0], PageFlow[i,1]);
            i += 1;
            if (tablecol!=0)
            {
                    tl_step("Table Column",FAIL,"Could not create table column. Function add_table_col did not work
properly");
                    pause("Failed to create table columns, Check function add_table_col");
                    rc=db_disconnect("CreateTable");
                    texit;
            }            # end of "if (tablecol!=0)"
      } # End of else related to "if (i == 0 ) "
      } # End of While loop for PAGE_FLOW table rc_db=db_disconnect("CreateTable");
}       # End of "function CreatePageFlowTable()"
```

```
function CreateTD_SD_OD_Tables(in HighestAbbr, WinTDObj[],WinODObj[])
{
    # local variables
    auto rc_db,tblval,TblAbbr,db_rc;
    auto record_number,rc;
    auto rc_tblcol,i,px;

# Connecting to database
    rc_db=db_connect("CreateTable","DBQ=C:\\Ent_Automation\\Databases\\MasterDB.mdb;DefaultDir=C:\\Ent_Automation\\
Databases;Driver={Microsoft Access Driver (*.mdb)};DriverId=281;FIL=MS Access;FILEDSN=C:\\Program Files\\Common Files\\ODBC\\DataSources\\
AUTO_DB;MaxBufferSize=2048;MaxScanR");

for (tblval=0;tblval<3;tblval++)
    {
    # Storing prefix value in a variable to use to create tables
        # Array is defined in main GUIEngine Script
    TblAbbr = tblPreFix[tblval];

# Creating abbreviated table
    db_rc=db_execute_query("CreateTable","CREATE TABLE " TblAbbr &HighestAbbr & " ( " &
                "TD_ID VARCHAR(50)," &
                "FLOW_ID VARCHAR(10)," &
                                                                "PAGE_ID VARCHAR(100)," &
                                                                "PAGE_ABBR VARCHAR(100)," &
                "TimeStart INTEGER," &
                "TimeStop INTEGER," &
                "VerifyObject VARCHAR(100)" &
                                                            " )",record_number);
    if (db_rc!=0)
    {
            tl_step("Create Table",FAIL,"Failed to create "&TblAbbr & HighestAbbr &" table. Either table already exists or SQL statement did
not work");
            pause("Failed to create "&TblAbbr & HighestAbbr &" table. Either table already exists or SQL statement did not work");
                rc=db_disconnect("CreateTable");
            texit;
    }    # End of "if (db_rc!=0)"

# Creating TD_ and SD_ table
    if (TblAbbr!="OD_")
    {
                i = 1;
                while ( WinTDObj[i] != "" )
                {
                            rc_tblcol=add_table_col ("CreateTable", TblAbbr & HighestAbbr, WinTDObj[i], 100);
                i +=1;
                    if (rc_tblcol!=0)
                    {
                        tl_step("INSERT INTO TABLE",FAIL,"Adding "& "\"" & WinTDObj[i] &"\"" object into "&"\"" TblAbbr & HighestAbbr "\"
was not successful");
                        pause ("Adding "& "\"" & WinTDObj[i] &"\"" object into "&"\"" TblAbbr & HighestAbbr "\" was not successful");
                                    rc=db_disconnect("CreateTable");
                        texit;
                    }        # End of "if (rc_tblcol!=0)"
                }            # End of " while ( WinTDObj[i] != "" ) "
    }                # End of "if (TblAbbr!="OD_")         "
        else
        {
                px = 1;
                while ( WinODObj[px] != "" )
                {
                rc_tblcol=add_table_col ("CreateTable", TblAbbr & HighestAbbr, WinODObj[px], 100),
                px +=1;
                    if (rc_tblcol!=0)
                    {
                        tl_step("INSERT INTO TABLE",FAIL,"Adding "& "\"" & WinODObj[px] &"\"" object into "&"\"" TblAbbr & HighestAbbr "\
" was not successful");
                        pause ("Adding "& "\"" & WinODObj[px] &"\"" object into "&"\"" TblAbbr & HighestAbbr "\" was not successful");
                        rc=db_disconnect("CreateTable");
                                    texit;
                    }        # End of "if (rc_tblcol!=0)"
                }            # End of "while ( WinODObj[px] != "" )"
        }                # End of else related to "if (TblAbbr!="OD_")"

if (TblAbbr=="TD_")
    {
        add_table_col ("CreateTable", TblAbbr & HighestAbbr, "PRE_ACTION", 100);
        add_table_col ("CreateTable", TblAbbr & HighestAbbr, "ACTION", 100);
        add_table_col ("CreateTable", TblAbbr & HighestAbbr, "POST_ACTION", 100);
    }
    }    # End of "for (tblval=1;tblval<=3;tblval++)"
    # Disconnecting from database
    rc=db_disconnect("CreateTable");
}    # End of function
```

FIGURE 9C

```
****  ++++++++++++++++++++++++++++++++++++++++++++++++++++++
****  Database flows found: 2
****  Test Description:
****
Fri Oct 12 17:10:54 2001 Start Application with IE
****  GUI MAP: "C:\ENT_AUTOMATION\GUI\The One Place.GUI" Exists
****  GUI loaded and Application is stable.
****  WINDOW: "The One Place" Exists
****  Edit Completed: Phonebook with input bloom
****  ACTION: Go, WINDOW: The One Place
****  Push Button Completed: ACTION with input Go
****  GUI MAP: "C:\ENT_AUTOMATION\GUI\Phone Directory.GUI" Exists
****  GUI loaded and Application is stable.
****  WINDOW: "Phone Directory" Exists
****  ACTION: Update phone information, WINDOW: Phone Directory
****  GUI MAP: "C:\ENT_AUTOMATION\GUI\Update.GUI" Exists
****  GUI loaded and Application is stable.
****  WINDOW: "Update" Exists
****  Edit Completed: Firstname with input Jim
****  Edit Completed: Lastname with input Schaefer
****  Browser closed
****  #### Test Passed ####
****  =========================================================
****  =========================================================
```

FIGURE 13

```
                    Starting New Iteration
***********************************************************
Date:       Fri Oct 12 17:03:46 2001
Screen Name:     The One Place
Screen Duration:  7 seconds
Screen Transition: 16 seconds
++++++++++++++++++++++++++++++++++++++++++++++++++++++++++++
Screen Name:     Phone Directory
Screen Duration:  2 seconds
Screen Transition: 9 seconds
++++++++++++++++++++++++++++++++++++++++++++++++++++++++++++
Date:       Fri Oct 12 17:03:46 2001
Screen Duration:  N/A
Screen Transition: N/A
Screen Name:

^---------------^ TEST COMPLETED ^-----------------^
                    Starting New Iteration
***********************************************************
Date:       Fri Oct 12 17:10:54 2001
Screen Name:     The One Place
Screen Duration:  7 seconds
Screen Transition: 15 seconds
++++++++++++++++++++++++++++++++++++++++++++++++++++++++++++
Screen Name:     Phone Directory
Screen Duration:  9 seconds
Screen Transition: 9 seconds
++++++++++++++++++++++++++++++++++++++++++++++++++++++++++++
Screen Name:     Update
Screen Duration:  11 seconds
Screen Transition: 9 seconds

^---------------^ TEST COMPLETED ^-----------------^
```

FIGURE 14

```
Marc 1,Oct 12 2001,17:03:46,16,9,N/A
Marc 1,Oct 12 2001,17:10:54,15,9,9
```

FIGURE 15

SYSTEMS AND METHODS FOR TABLE DRIVEN AUTOMATION TESTING OF SOFTWARE PROGRAMS

DESCRIPTION OF THE INVENTION

1. Field of the Invention

This invention relates generally to software functionality verification, and more specifically to table driven automation for performing functional testing of software programs.

2. Description of Related Art

Software programs must be tested to detect and correct as many "bugs" or errors as possible before placing them into a production environment or releasing a version of the software programs for public or in-house use. Conventional methods for automated software testing systems utilize scripting languages to enable a programmer to generate scripts or programs that may be run to test a software program. The scripts typically include information about the functions performed by the underlying software program. In addition, a user is required to generate a test specification which includes state definitions specifying all possible permutations and combinations for performing a desired test procedure. Thus, a programmer or support personnel is required to learn a scripting language in order to generate scripts to test the software program. In addition, whenever new functionality is added to or taken away from the software program, the scripts must be edited manually to incorporate the new features or to remove test support for the removed features. This increases the cost for producing software applications and wastes other resources.

A test automation system for performing functional testing of a software program is described in U.S. Pat. No. 6,002,869. The systems and methods described in this patent provide for testing software programs by using a plurality of user-defined test functions configured to test discrete components of the software program. In addition, such systems and methods utilize a user defined test specification associated with the software program to provide state definitions that specify a desired test approach for each type of test procedure to be performed on the software program. One disadvantage of such systems and methods is that they require a person with intimate knowledge of the implementation details of the software program to create the test functions. Another disadvantage is that whenever a change is made to a software program that affects the functionality of the program, a person familiar with the implementation details of the software program may have to create new test functions or revise existing test functions to accommodate the changes to the software program. In addition, resources may be required to revise the user defined test specification.

Methods and apparatus for performing functional testing of a software program are also described in U.S. Pat. No. 5,905,856. The methods and apparatus described in this patent provide for testing software programs by using a plurality of user-defined test scripts configured to test discrete components of the software program. In addition, such methods and apparatus utilize a test plan for invoking a sequence of the test scripts and includes associated parameter inputs for the test scripts. A Plan Parser uses data loaded into a plurality of tables to check the validity of a test plan prior to execution of a software program. In addition, the Plan Parser builds memory tables used by an interpreter to execute the test plan. Similar to U.S. Pat. No. 6,002,869, one disadvantage of methods and apparatus described in U.S. Pat. No. 5,905,856 is that a computer programmer with intimate knowledge of implementation details of the software program must develop a comprehensive set of test scripts. Another disadvantage is that whenever a change is made to a software program that affects the functionality of the software program, the programmer has to create new test scripts or revise existing test scripts to accommodate changes in the software program. In addition, resources may be required to revise the user defined test plan.

One known product for automated testing of a software program is WinRunner by Mercury Interactive Corporation. WinRunner provides a testing tool that enables users to generate a test case for a software program by recording in test scripts a user's interactions with the software program. Each time a test case is recorded, WinRunner builds a Graphical User Interface ("GUI") map file. The GUI map is then used with the test scripts to play back the test case. One disadvantage of this system, is that when a software program changes a user may have to edit the GUI map to incorporate any changes to GUI objects and may have to revise or recreate a test script.

Accordingly, there is a need for systems and methods for testing software programs that do not require a user to create or revise test scripts or functions to drive the testing of the software program.

SUMMARY OF THE INVENTION

Systems and methods consistent with the present invention facilitate table driven automated testing of software programs that overcomes aspects of the aforementioned related art. Such systems and methods eliminate the need for a user to create or revise test scripts or functions to drive the testing of a software program.

In accordance with one aspect of the present invention, systems and methods are provided for table driven automated testing of a software program. Such systems and methods retrieve a test case in a table structure specifying an execution path for testing the software program; retrieve a user interface map having information for processing a user interface associated with the software program; execute the software program according to the execution path based on the test case and the user interface map; and monitor results of the execution of the software program in accordance with the execution path.

In accordance with another aspect of the present invention, systems and methods are provided for translating one or more user interface maps into a set of tables to facilitate testing of a software program. Such systems and methods receive a request to translate a user interface map into a set of tables, wherein the request includes a filename for the software program; retrieve a list of user interface map files that exist in a directory specified by the filename; and create the set of tables based on the retrieved list of the user interface map files.

In accordance with yet another aspect of the present invention, systems and methods are provided for inputting data into a set of tables to facilitate testing of a software program. Such systems and methods receive in a first user interface a first information identifying a sequence for activating user interfaces in the software program; receive in a second user interface a second information specifying an execution path of the software program; store the first information in a first table; and store the second information in a group of tables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 4 is a diagram of a GUI map for a "Flight Reservation" user interface;

FIG. 5 is a diagram of an example of a GUI map for a Web-based application consistent with the present invention;

FIG. 7 is a diagram of one example of a Function_Prototype table consistent with the present invention;

FIG. 8A is a diagram of an example of a PAGE_ABBR table consistent with the present invention;

FIG. 8B is a diagram of an example of a PAGE_FLOW table consistent with the present invention;

FIG. 8D is a diagram of an example of a seized data table consistent with the present invention;

FIG. 9A illustrates an exemplary Constants script that may be used to define a data definition for a PAGE_FLOW table in a manner consistent with the present invention;

FIG. 9B illustrates an exemplary function that may be used to create a PAGE_FLOW table in a manner consistent with the present invention;

FIG. 9C illustrates an exemplary function that may be used to create a test data table, a seized data table, and an object data table in a manner consistent with the present invention;

FIG. 13 illustrates a block diagram of an example of a TraceLog file for storing results of the execution of a software program for a test case in a manner consistent with the present invention;

FIG. 14 illustrates an example of a daily trace activity log for storing detailed result information about transition times of the execution of a software program for a test case in a manner consistent with the present invention; and FIG. 15 illustrates an example of a date file log for storing result information about timestamps for transition times of the execution of a software program for a test case in a manner consistent with the present invention.

DETAILED DESCRIPTION

Reference will now be made in detail to the exemplary embodiments consistent with the invention, examples of which are illustrated in the accompanying drawings. Wherever possible, the same reference numbers will be used throughout the drawings to refer to the same or like parts.

Systems and methods consistent with the present invention provide a table driven automation system for performing functional testing of a software program. Such systems and methods may include a GUI translator component to translate one or more GUI maps into a set of database tables, a data input component to facilitate creation of one or more test cases, which are input as data into the tables by the data input component; a software controller component; and a test engine component. A test case may define sequences or paths of transitions that the software program may take during execution. A GUI map is a file that serves as a repository of information about user interface objects in the software program.

The test engine component may query the tables to retrieve data for a test case and may use one or more GUI maps along with the data for the test case to call a function in the software controller. The software controller component may receive instructions and data from the test engine component and in turn transmit instructions and data to the software program thereby controlling the execution of the software program. The software controller may transmit results of the processing of the software program to the test engine component. The test engine component may send the results to a log file or use the results to generate one or more reports detailing aspects of the functional test of the software program.

Description of Automation System 100

Figure 1:
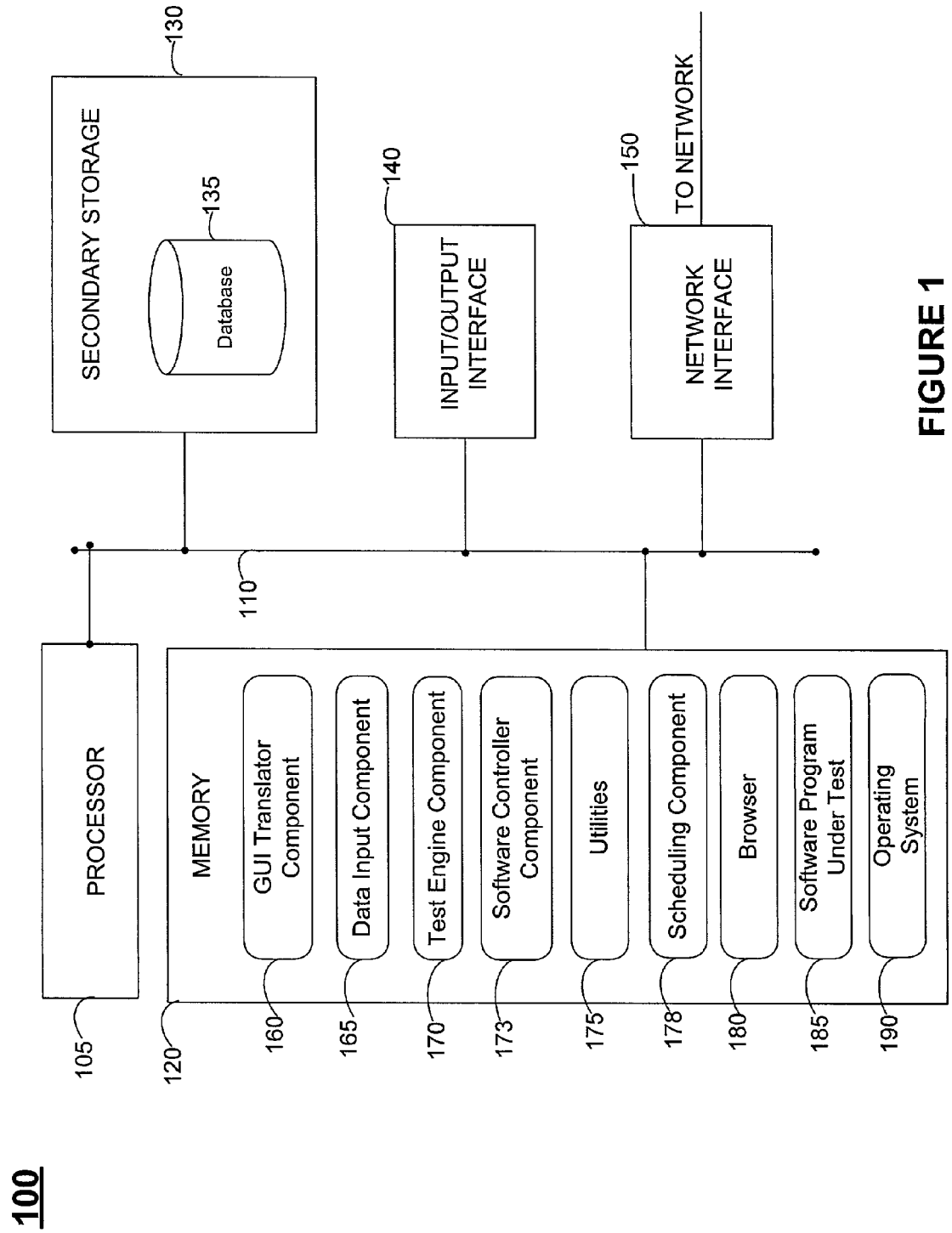
FIG. 1 is a block diagram of an automation system consistent with the present invention.

FIG. 1 is a block diagram of an automation system 100, consistent with the present invention, for performing table driven automation testing of software programs. Automation system 100 may be implemented using any type of computer, such as a personal computer, a workstation, a minicomputer, a mainframe computer, a hand-held device, etc.

Automation system 100 includes a processor 105, a bus 110, a memory 120, a secondary storage 130, an input/output interface component 140, and a network interface module 150. Processor 105 may be any commercially available processor capable of executing program instructions, such as the Pentium microprocessor from Intel Corporation, SPARC processor, Power PC microprocessor, PA_RISC processor. Bus 110 facilitates communication of data and other information among components of system 100.

Memory 120 may include the following: a graphical user interface ("GUI") translator component 160 for translating a GUI map into a set of database tables; a data input component 165 for inputting data into one or more of the tables; a test engine component 170 for retrieving data from one or more of the tables and using the retrieved data and the GUI map to specify execution paths for testing of a software program 185; a software controller component 173 for receiving instructions and data from test engine component 170 and in turn transmitting instructions and data to the software program 185 for controlling the execution of software program 185, and for transmitting results of the processing of software program 185 to test engine component 170; and an operating system 190 for generally controlling and coordinating operation of system 100.

Memory 120 may optionally include a scheduling component 178 for scheduling a time for performing automated testing of a software program and testing the software program at the specified time; and a browser 180 such as the Microsoft Internet Explorer or Netscape, which may be used to invoke or initiate a Web-based software program 185. Further, memory 120 may also optionally include a set of utilities 175, which may include: a data import utility for importing data into automation system 100; a page flow logic utility for verifying FLOW_ID and PAGE_ID pointers in the tables prior to testing a software program; object coverage utility for verifying that all windows, data inputs, and action objects defined in the tables have been used in at least one test case; and a data dictionary verification utility to verify the information in one or more of the tables. Memory 120 may be configured using random access memory ("RAM") alone or in combination with others.

GUI translator component 160, data input component 165, test engine component 170, software controller component 173, and utilities 175, may each be stored on secondary storage 130 and loaded into memory 120 to provide instructions for processing transactions associated with performing table driven automation testing of software program 185. Software program 185 may be loaded into memory 120 from secondary storage 130 for testing by test engine component 170.

Operating system 190 controls allocation of system resources. It performs tasks, such as memory management, process scheduling, networking, and services, among other things.

Secondary storage 130 may be configured using any computer-readable medium, such as a hard disk drive, a compact disc ("CD") drive, and/or a read/write CD drive. From storage 130, software and data may be loaded into memory 120. Similarly, software and data in memory 120 may be stored in secondary storage 130. Software program 185 may be stored in secondary storage 130 and loaded into memory 120 for testing by test engine component 170. In addition, secondary storage 130 may include a database 135 for storing a plurality of tables.

Input/Output interface component 140 may include one or more of, a keyboard, a pointing device, a voice recognition device, a keypad, display unit, or a printing device. Network interface module 150 may include hardware and software for sending and receiving data over a network, and may be used, for example, in testing a software program that has a client/server architecture or a Web-based application.

GUI translator component 160, data input component 165, test engine component 170, and utilities 175 may each be implemented in any computer programming language, scripting tool, or other software tool, such as C++, C, Java, Hypertext Markup Language ("HTML"), Visual Basic, Mercury Interactive Corporation's test scripting language ("TSL"), etc. The software program 185 may be a client/server program, a Web-based application, a window-based application, a software application that runs on a wireless device, etc.

Table Driven Automated Testing of a Software Program

Figure 2:
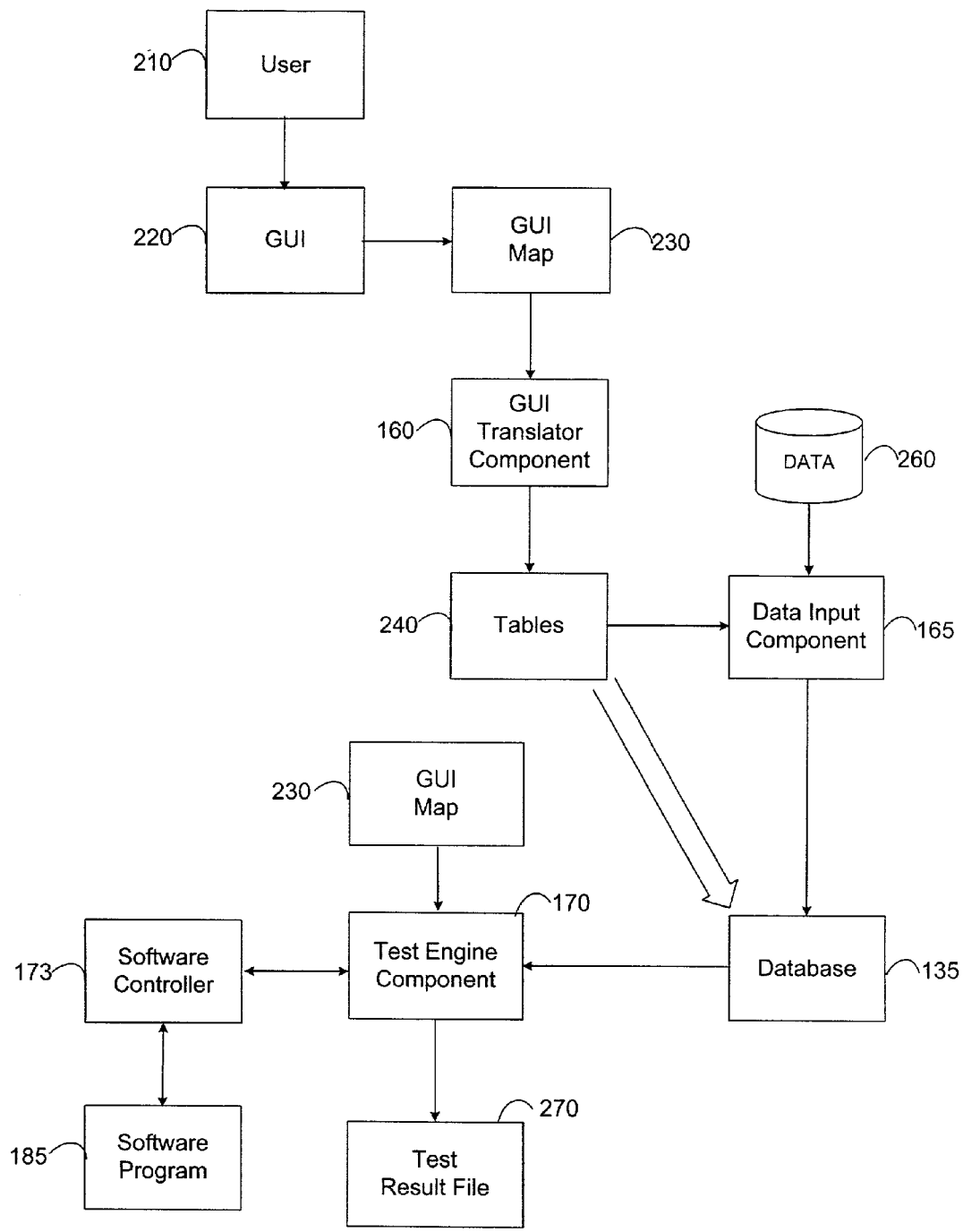
FIG. 2 is a block diagram to illustrate operation of an automation system consistent with the present invention.

FIG. 2 is a block diagram to illustrate operation of an automation system consistent with the present invention. As shown in FIG. 2, a user 210 may desire to test a software program 185 that includes one or more GUI's 220. User 210 may generate a GUI map 230 for each GUI 220 of software program 185. Each GUI map 230 may include hierarchically organized information about a window and objects on the window, such as text fields, boxes, buttons, menus, etc. A GUI map may be generated manually by entering information about a window and the objects on the window into a text file. Alternatively, a GUI map may be created through a GUI map editor, such as the one provided by the Mercury WinRunner product. GUI map files may have the file extension ".GUI" and may be stored on secondary storage 130.

Once a GUI map 230 is created, user 210 may access a GUI translator component 160 to translate GUI map 230 into a set of tables 240. The set of tables 240 may be stored in database 135.

The data in tables 240 may include one or more test cases, which define sequences or paths of transitions that the software program takes during execution. The tables 240 may include a PAGE_ABBR table and a PAGE_FLOW table. PAGE_ABBR table may store an abbreviated name and a logical name for each window of the software program 185. Each row in the PAGE_FLOW table may represent an execution path for testing a software program 185 and may correspond to a particular test case. The PAGE_ABBR table may include a column PAGE_ABBR with data that corresponds to data in a Page Sequence section of the PAGE_FLOW table.

In addition, a GUI translator component may create three tables for each GUI map associated with a software program 185. The combination of the data in the three tables may specify one or more sub-paths for the execution of a window in the software program 185. The three tables may include the following: a test data table, which may include data that may be input into objects on the window associated with the GUI map during execution of the software program 185; a seized data table, which may include data that may instruct the test engine component to verify whether data selected on one window is accurately displayed on another window; and an object data table, which may include columns that match the logical names of Action" data objects that cause the software program 185 to transition from an active window to a next window during execution of the software program 185.

The three tables may each include a column named FLOW_ID, which may correspond to the column FLOW_ID in the PAGE_FLOW table. In addition, each of the three tables may include a column PAGE_ID, which corresponds to the data in the Page Sequence section of the PAGE_FLOW table.

User 210 may access a data input component 165 to input data 260 into one or more of the tables 240. The data 260 may include information that may be used by test engine component 170 to test the software program 185. Alternatively, user 210 may access a data import utility to import data into one or more of the tables 240. Data import utility may import data 260 from, for example, a Microsoft Excel file.

User 210 may access the test engine component 170 to request testing of the software program 185. Test engine component 170 may retrieve data from one or more of the tables 240, wherein the data specifies the execution paths for testing the software program 185. In addition, test engine component 170 may open one or more of the generated GUI maps associated with the software program 185, and may read the contents of the GUI map into memory 120. Test engine component 170 may then call a software controller component 173 function to transmit one or more instructions and data to the software program 185 for controlling the execution of the software program 185. A software controller component 173 may include a library of functions that may be called to provide instructions and data to the software program 185. The software controller component 173 may shield the calling program, such as test engine 170 from the implementation and execution details of the software program 185. In addition, software controller component 173 may transmit results of the processing of software program 185 to the calling program. The software controller component 173 may include a commercial software controller, such as TSL provided by the Mercury Interactive Corporation.

Test engine component 170 may also use the contents of the GUI map 230 stored in memory 120 to determine which software controller component 173 function to call to process the objects on the window that may be described by the GUI map 230. Test engine component 170 may also monitor results, received from the software controller 173 about the execution of the software program 185, and may store such results in one or more test result files 270. Optionally, test engine component 170 displays the results to user 210 or uses the results to generate one or more performance reports.

Further, the stages described above in FIG. 2 may alternatively be automatically performed by an application software program, such as scheduler component 178.

User Interfaces for an Exemplary Software Program

Figure 3:
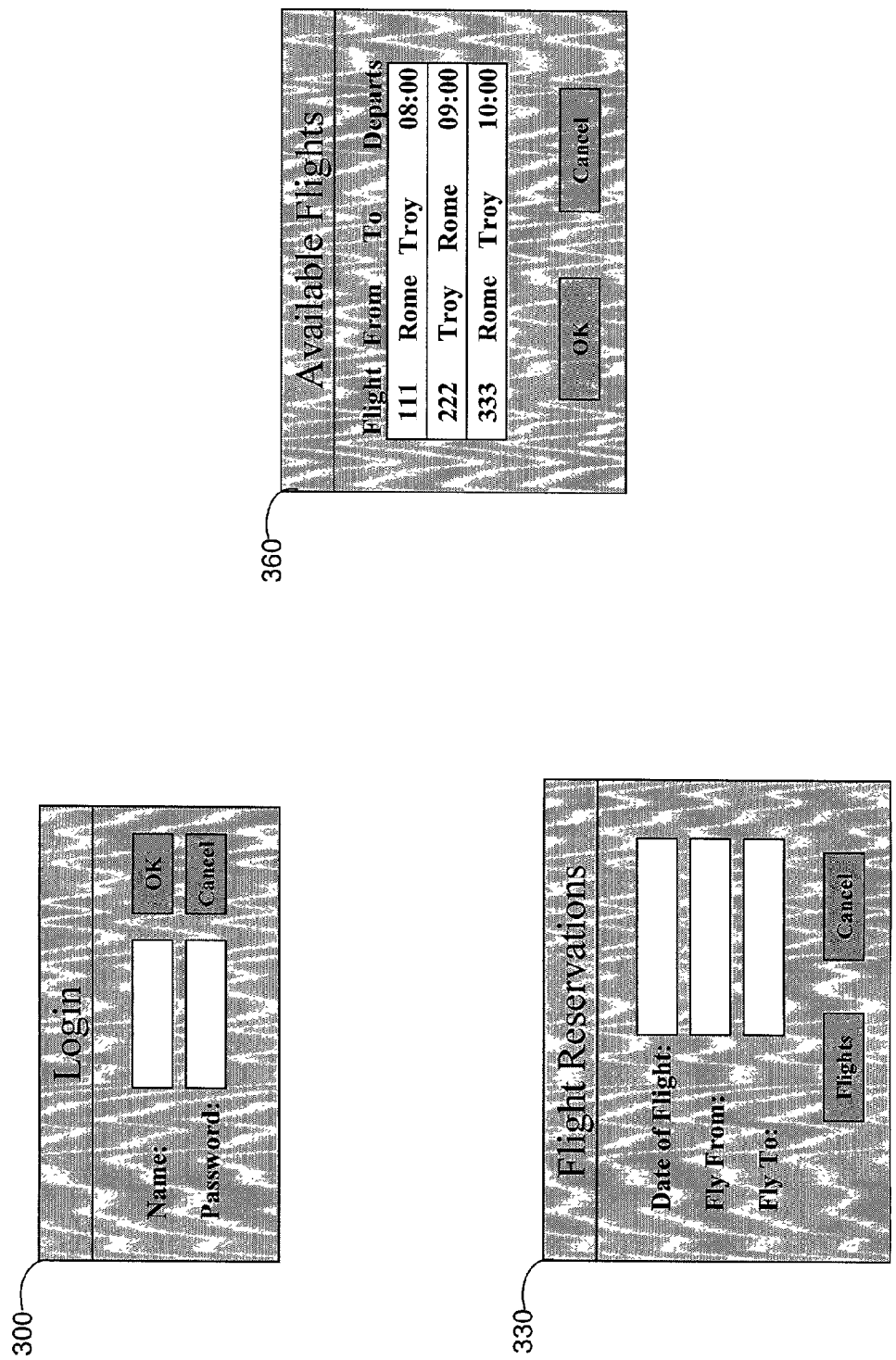
FIG. 3 illustrates user interfaces for an exemplary software program consistent with the present invention.

FIG. 3 illustrates three GUI windows for an exemplary software program 185 for a Flight Reservation System. As shown in FIG. 3, the user interfaces include a Login window 300 for logging into a Flight Reservation System, a Flight Reservations window 330 for making flight reservations, and an Available Flights window 360 for selecting from a list of available flights. Thus, a user 210 desiring to test the functionality of the software program for the Flight Reservation System may generate three GUI maps 230, one for each of the three GUI windows. For example, a GUI map for Login window 300 may have a filename "Login.GUI"; a GUI map for Flight Reservations window 330 may have a filename "Flight Reservations.GUI"; and a GUI map for Available Flights window 360 may have a filename "Available Flights.GUI". The GUI maps may be stored in the same directory as the software program 185 on secondary storage 130.

A user 210 may only be interested in testing certain aspects of software program 185. Therefore, user 210 need only generate GUI maps 230 for the aspects of the software program 185 for which the user 210 desires to test. For example, if the user 210 desires to only test the Flight Reservations window 630, the user 210 may generate a single GUI map 230 having a filename "Flight Reservations.GUI".

FIG. 4 is a diagram of a GUI map 230 for a "Flight Reservation" user interface like that shown in FIG. 3. As shown in FIG. 4, the file format of a GUI map 230 may include, for each object, a logical name followed by a physical description of the object enclosed in braces. Each class of objects has a default set of physical attributes. A GUI map may be hierarchically organized into a window section 400 and then objects (410–440) as they are organized on the window. The first line of each GUI map 230 may include the logical name for the window, in this case, "Flight Reservation". Logical names for windows and other objects have quotation marks around them if they contain more than one word. A colon denotes the end of the logical name. A physical description of the object follows the logical name line and contains class type and other class specific information enclosed in braces. Class specific information may vary from one class to another, but remains consistent within a class.

For example, as shown in FIG. 4, the window object 400 has the logical name "Flight Reservation" and its class type is "window". In addition, the GUI map 230 for the Flight Reservation window 330 includes object information for the other objects on the window, including "Date of Flight" text field 410, "Flights" button 420, "Fly From" pull down list 430, and "Fly To" pull down list 440.

FIG. 5 is a diagram of an example of a GUI map 230 for a Web-based application consistent with the present invention. As shown in FIG. 5, the file format of a GUI map 230 for a Web-based application may include hierarchically organized information about a Web page and objects on the Web page. A GUI map for a Web-based application may also be hierarchically organized into a window section 500, and then objects (510–570) as they are organized on the window. Thus, as used in the present invention, a window may represent a Web page. Similar to the GUI map shown in FIG. 4, The first line of each GUI map 230 for a Web-Based application may include the logical name for the window, in this case, "ABCD_LLP". Logical names for windows and other objects have quotation marks around them if they contain more than one word. A colon denotes the end of the logical name. A physical description of the object follows the logical name line and contains class type and other class specific information enclosed in braces. Class specific information may vary from one class to another, but remains consistent within a class.

Translating a GUI Map into a Set of Database Tables

Figure 6:
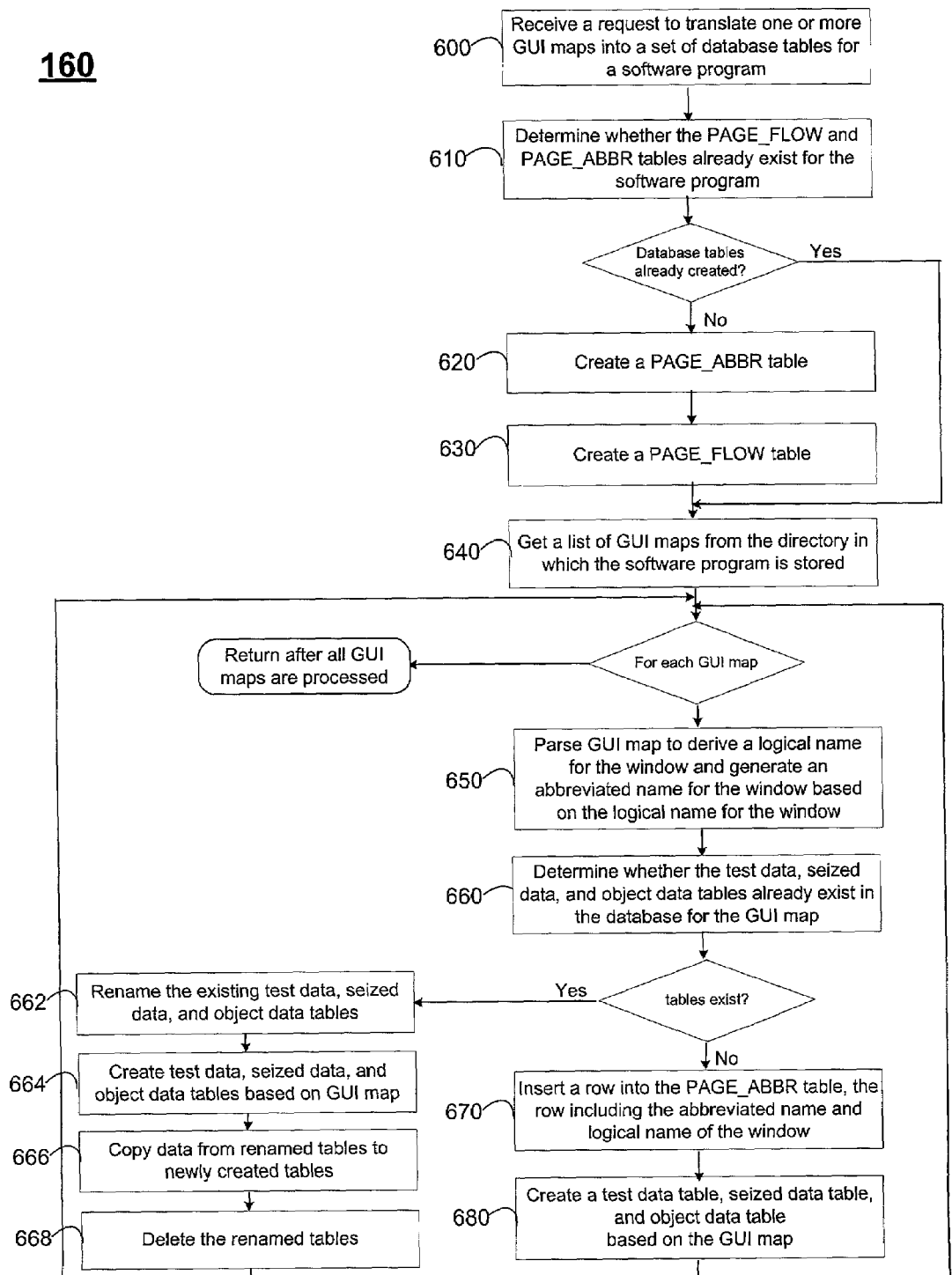
FIG. 6 is a flowchart showing a method for translating one or more GUI maps into a set of tables in a database to facilitate functional testing of a software program based on data residing in the tables in a manner consistent with the present invention.

FIG. 6 is a flowchart showing a method implemented by translator component 160 for translating one or more GUI maps 230 into a set of tables 240. In one embodiment of the invention as shown in FIG. 6, GUI translator component 160 may receive a request to translate one or more GUI maps 230 into a set of tables 240 to facilitate functional testing of a software program 185 based on data entered into the tables 240 (stage 600). The request may come from a user 210 or an application software program. The request may include a filename for the software program 185. In the case of a Web-based application, the filename may be a Uniform Resource Locator ("URL"), otherwise, the filename may include a directory path followed by the name of the file that includes the software program 185. Thus, a filename may indicate the location of the software program 185 on secondary storage 130.

A PAGE_FLOW table may include information that specifies one or more execution paths for testing a software program 185. Each row in a PAGE_FLOW table may represent an execution path for testing a software program 185 and may correspond to a particular test case. An execution path may specify the steps that software program 185 will take when being executed using the test case data. An execution path may include one or more sub-paths, with each sub-path determined by test case data being processed by the software program 185. A PAGE_ABBR table may include information about the user interface windows in the software program 185.

GUI translator component 160 may determine whether the PAGE_FLOW and PAGE_ABBR tables already exist in database 135 for the software program (stage 610). Database 135 may be, for example, a Microsoft Access database, an ORACLE database, or any other relational database, and may be stored on secondary storage 130. If the tables do not exist, GUI translator component 160 may create a page abbreviation table with the name "PAGE_ABBR" in database 135 (stage 620). The PAGE_ABBR table may have two columns, such as "ABBR_NAME" and "FULL_NAME". This table may store an abbreviated name and a logical name for each window of the software program 185.

Next, GUI translator component 160 may create a PAGE_FLOW table (stage 630). A PAGE_FLOW table includes data that may specify the procedure used to invoke the software program 185, the number of times to run each test case, and the sequence of windows that make up each test case. A PAGE_FLOW table may have two sections, an Alpha section and a Page Sequence section. The Alpha section of the PAGE_FLOW table provides information that may be used to launch the software program 185 and display the first window in the software program 185. The Page Sequence section of the PAGE_FLOW table may store page abbreviations that makeup the sequence of windows associated with a test case, and thus indicate the sequential order in which the windows are to be processed during execution of the software program 185.

GUI translator component 160 may search the directory in which the software program 185 is stored on secondary storage 130 and generates a list of GUI map files associated with software program 185 (stage 640). For each GUI map in the list, GUI translator component 160 may open the GUI map file, parse the GUI map to derive the logical name of a window, using well known string parsing methods, and generate an abbreviated name from the logical name of the window (stage 650). For instance, GUI translator component 160 may generate the abbreviated name from the capital letters and numbers contained in the logical name of the window.

For example, GUI translator component 160 may abbreviate the logical name of the "Flight Reservations" window to "FR". GUI translator component 160 checks the abbreviated name against the data in the PAGE_ABBR table to determine whether the abbreviated name is a duplicate. If a duplicate abbreviated name is found, a number may be appended to the end of the logical name of the window and the abbreviated name to ensure that the logical name of the window and the abbreviated name are unique. This reduces the space needed to display the window names and simplifies setting up the Page Flow sequences.

Thereafter, GUI translator component 160 may determine whether the test data, seized data, and object data tables already exist in database 135 for the GUI map, by querying the PAGE_ABBR table using the abbreviated name (stage 660). If this is the first time that the GUI map is being translated for the software program 185, then the three tables may not exist in database 135.

If the abbreviated name is not found in the PAGE_ABBR table ("No"), then the test data, seized data, and object data tables may not exist in database 135. GUI translator component 160 may insert a row into the PAGE_ABBR table. The row may include the abbreviated name, which may be stored in the column ABBR_NAME, and the logical name of the window, which may be stored in the column FULL_NAME (stage 670). GUI translator component 160 may create unique table names for each of the three tables by prefixing the abbreviated name with a "type tag" (TD_, SD_, and OD_). For example, GUI translator component 160 may create the following table names for the Flight Reservations window 630: "TD_FR" for the test data table, "SD_FR" for the seized data table, and "OD_FR" for the object data table. Next, GUI translator component 160 may create the test data, seized data, and object data tables based on the GUI map (stage 680).

Otherwise ("Yes"), the test data, seized data, and object data tables may already exist in the database, and GUI translator component 160 may rename the existing test data, seized data, and object data tables (stage 662). To rename the tables, GUI translator component 160 may insert the word "DELETE" at the front of the table name for the existing test data, seized data, and object data tables. For example, in the case of the "Flight Reservations" window, the test data, seized data, and object data tables may be renamed to "DELETE_TD_FR", "DELETE_SD_FR", and "DELETE_OD_FR". GUI translator component 160 may create test data, seized data, and object data tables based on the GUI map (stage 664). Thereafter, GUI translator component 160 may copy the data from the renamed tables to the newly created test data, seized data, and object data tables where the column names of the newly created tables match those of the corresponding renamed tables (stage 666). Next, GUI translator component 160 may delete the renamed tables (stage 668).

The combination of the data in the three tables may specify one or more sub-paths for the execution of the software program 185. All three of the tables may include an Alpha section. The Alpha section may include information for mapping the three tables to the PAGE_FLOW table through fields FLOW_ID and PAGE_ID. Unique combinations of FLOW_ID and PAGE_ID in each of the three tables may match FLOW_ID and Page Sequence (PAGE_1–PAGE_12) columns in the corresponding PAGE_FLOW table. In addition, the unique combination may identify which row of data is to be used when test engine component 170 is providing data to a window or initiating an action while executing a software program 185. The fields PAGE_ABBR, TimeStart, TimeStop, and VerifyObject may be populated by test engine component 170 during execution of the software program 185.

A test data table includes an input data section that may include columns that match the logical names of input objects defined in the GUI map 230, such as text boxes, radio buttons, lists, etc. For example, the input data section for the Flight Reservations GUI map may include the following columns: "Date of Flight", "Fly From", and "Fly To". A seized data table includes a seized data section. Like the input data section of the test data table, the seized data section of the seized data table may include columns that match the logical names of input objects defined in the GUI map 230.

Because the database management system may not allow special characters to be included in column names, GUI translator component 160 may scan each GUI map object in the GUI map 230 to check for special characters that cannot be used as column headings in the table. If any such offending characters are found, the GUI map may be edited to remove the offending character(s). Thus, such offending characters are not used in generating the column headings. This scan may be performed, for example, prior to generating the input data section of the test data table.

The input data section of the test data table may include test data that may be input into the objects associated with the columns during execution of the software program for a test case. The data in the seized data section of a seized data table may instruct test engine component 170 to verify whether data selected on one window is accurately displayed on another window. Storing an "X" in a column of the seized data section of the seized data table may notify test engine component 170 that the user 210 seeks information about data currently being displayed in that object during execution of the software program for the test case. For example, when test engine component 170 completes execution of the "Fly From" object, the "Fly From" column in the seized data table may include the actual data value entered from the test data table. Thus, test engine component may record the input data in the seized data table for the object for which the user 210 seeks information.

An object data table includes an action data section. The action data section of an object data table may include columns that match the logical names of "Action" data objects that cause the software program to transition from an active window to a next window in the test case. Action data objects may include objects such as push buttons, html rectangles, etc. For example, the action data section for the Flight Reservations GUI map may include the column "Flights".

A test data table may include an Omega section, which may include the following columns: Pre_Action, Action, and Post_Action. The Pre_Action and Post_Action columns may store function prototypes that may be used, for example, to perform verification (e.g., string comparison) and/or initiate tasks (e.g., printing a window). These function prototypes are predefined and may be stored in a Function_Prototype table, which may be stored in database 135. The Action column may store "Action" data objects that may cause the software program to transition from an active window to a next window in the test case. Action data objects may include, for example, push buttons, html rectangles, etc.

FIG. 7 is a diagram of one example of a Function_Prototype table 700 consistent with the present invention. As described above, the Function_Prototype table 700 may be used in the Omega section of the test data table. Function_Prototype table 700 may include a single column and may store a set of predefined function calls that may be used as pre-actions or post-actions in the Omega section of a test data table. Each database may include a single Function_Prototype table 700, which is delivered with automation system 100.

FIG. 8A is a diagram of an example of a PAGE_ABBR table 800a consistent with the present invention. As shown in FIG. 8A, the first column is labeled "ABBR_NAME" 810a, and the second column is labeled "FULL_NAME" 820a. As described above, data of column 810a corresponds to an abbreviated name for each window of the software program 185, while 820a corresponds to a full logical name for each window.

FIG. 8B is a diagram of an example of a PAGE_FLOW table 800b consistent with the present invention. As shown in FIG. 8B, and as described above, PAGE_FLOW table 800b may include an Alpha section and a Page Sequence section. The Alpha section of the PAGE_FLOW table 800b provides a means to control test case execution via test engine component 170. The fields in the Alpha section may include the following: TD_ID 810b for use by third party testing software, such as Mercury Test Director or UNIX Chron for scheduling execution of a test case; FLOW_ID 820b is equivalent to the test case identifier and may be used by test engine component 170 to control execution of a test case; RUN_COUNT 830b may control the number of times the test case is to be run, such as when a test case must be run multiple times to setup a test condition (e.g., Login, Lockout) or must be run continually (e.g., Heartbeat, Timing Log); FLOW_DESC 840b may be used to store a text description of the test case; and LAUNCH_APPL 850b may store information that may be used to launch the software program. A RUN_COUNT of zero may indicate that the test case is not to be run in testing the software program 185.

The Page Sequence section of the PAGE_FLOW table 800b may store page abbreviations that makeup the sequence of windows 890b associated with a test case, and correspond to the data in column ABBR_NAME 810a of table PAGE_ABBR 800a. Although the example in FIG. 8B shows fields for twelve windows, the invention is not to be limited to that number and may include any range of windows limited only by the database management system.

Figure 8C:
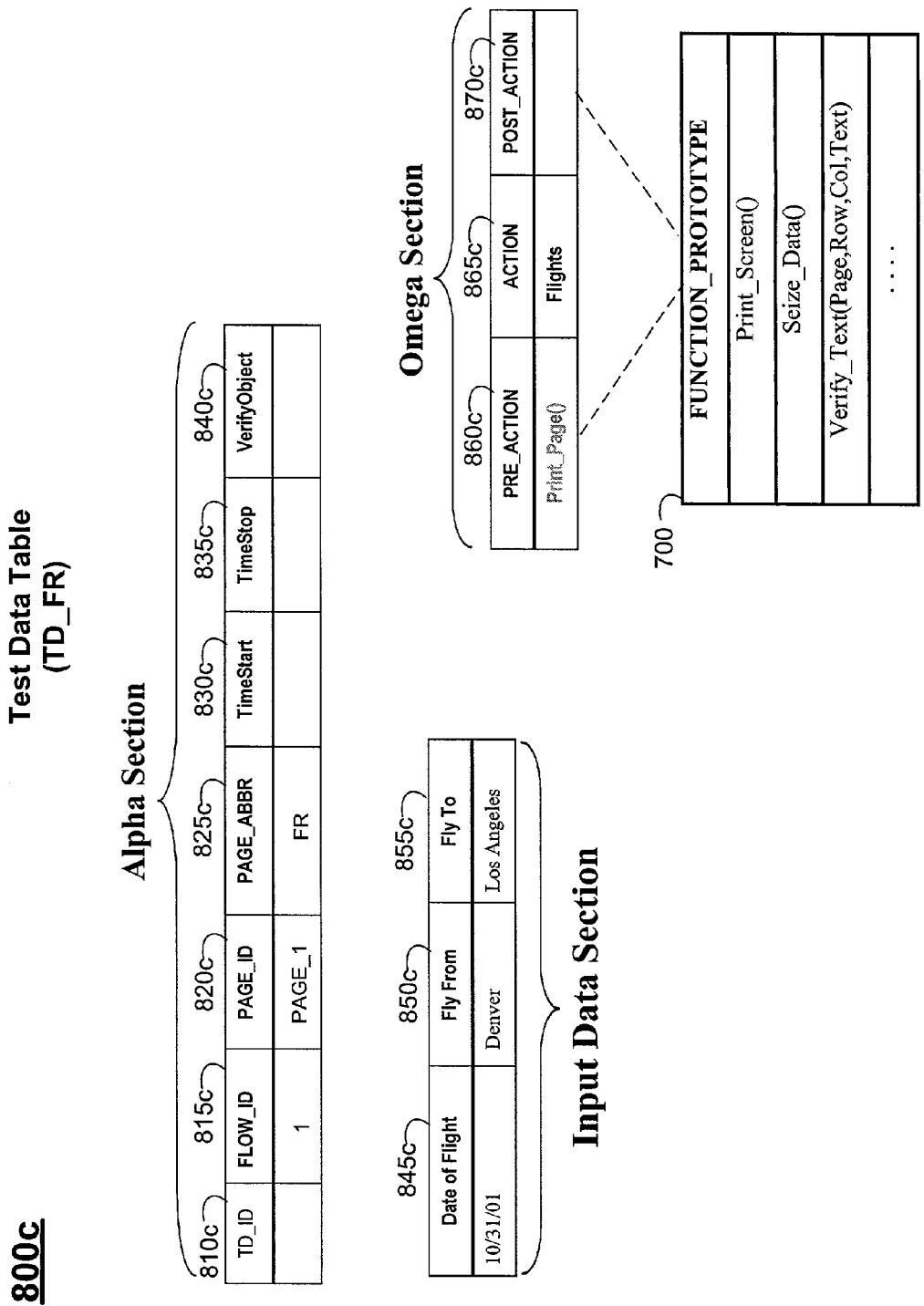
FIG. 8C is a diagram of an example of a test data table mapped to a Function_Prototype table consistent with the present invention.

FIG. 8C is a diagram of an example of a test data table 800c mapped to a Function_Prototype table consistent with the present invention. As shown in FIG. 8C, and as described above, a test data table 800c may include three sections, an Alpha section, an input data section, and an Omega section. The Alpha section of test data table 800c may include the following columns: TD_ID 810c, FLOW_ID 815c, PAGE_ID 820c, PAGE_ABBR 825c, TimeStart 830c, TimeStop 835c, and VerifyObject 840c.

Unique combinations of FLOW_ID 815c and PAGE_ID 820c may match FLOW_ID 820b and Page Sequence (e.g., PAGE_1–PAGE_12) columns 890b in the PAGE_FLOW table 800b, and may identify which row of data of the input data section of the test data table 800c is to be used when populating a window in a test case. The PAGE_ABBR 825c may store the abbreviated name of the corresponding window. TimeStart 830c may store a time stamp indicating the time that the window is activated during execution of the software program 185 for the active test case. TimeStop 835c may store a time stamp indicating the stop time, and is populated immediately after a window Action is initiated.

The difference between the TimeStop and TimeStart times may indicate the amount of time it takes to populate a window (input time) and/or how long it takes to get from one window to the next (transition time). The transition time may be used to report response times for Web-based applications, and other applications. The VerifyObject 840c column may include the logical name of an object that is to be verified during execution of the software program for a test case.

As shown in FIG. 8C, and as described above, the Omega section of the test data table 800c may include the following columns: Pre_Action 860c, Action 865c, and Post_Action 870c. The Pre_Action 860c and Post_Action 870c columns may store function prototypes that may be used, for example, to perform verification (e.g., string comparison) and/or initiate tasks (e.g., printing a window). These function prototypes may be predefined and are stored in Function_Prototype table 700. The Action column 865c may store "Action" data objects that cause the software program to transition from an active window to a next window in the test case.

FIG. 8D is a diagram of an example of a seized data table 800d consistent with the present invention. As shown in FIG. 8D, and as described above, a seized data table 800d may include an Alpha and a seized data section. The Alpha section of test data table 800d may include the following columns: TD_ID 810d, FLOW_ID 815d, PAGE_ID 820d, PAGE_ABBR 825d, TimeStart 830d, TimeStop 835d, and VerifyObject 840d. The columns TD_ID 810c, PAGE_ABBR 825c, TimeStart 830c, TimeStop 835c, and VerifyObject 840c may be used by, for example, scheduling component 178 to provide information related to verifying scheduling activities.

Unique combinations of FLOW_ID 815d and PAGE_ID 820d may match FLOW_ID 820b and Page Sequence (e.g., PAGE_1–PAGE_12) columns 890b in the PAGE_FLOW table 800b, and may identify to test engine component 170 which row of data in the seized data section of the seized data table 800d is to be used when verifying data for an input object in a test case.

The data in the seized data section of a seized data table 800d may instruct test engine component 170 to verify whether data selected on one window is accurately displayed on another window. Storing an "X" in a column of the seized data section of the seized data table 800d may notify test engine component 170 that the user 210 seeks information about data currently being displayed in that object during execution of the software program 185 for the test case.

Figure 8E:
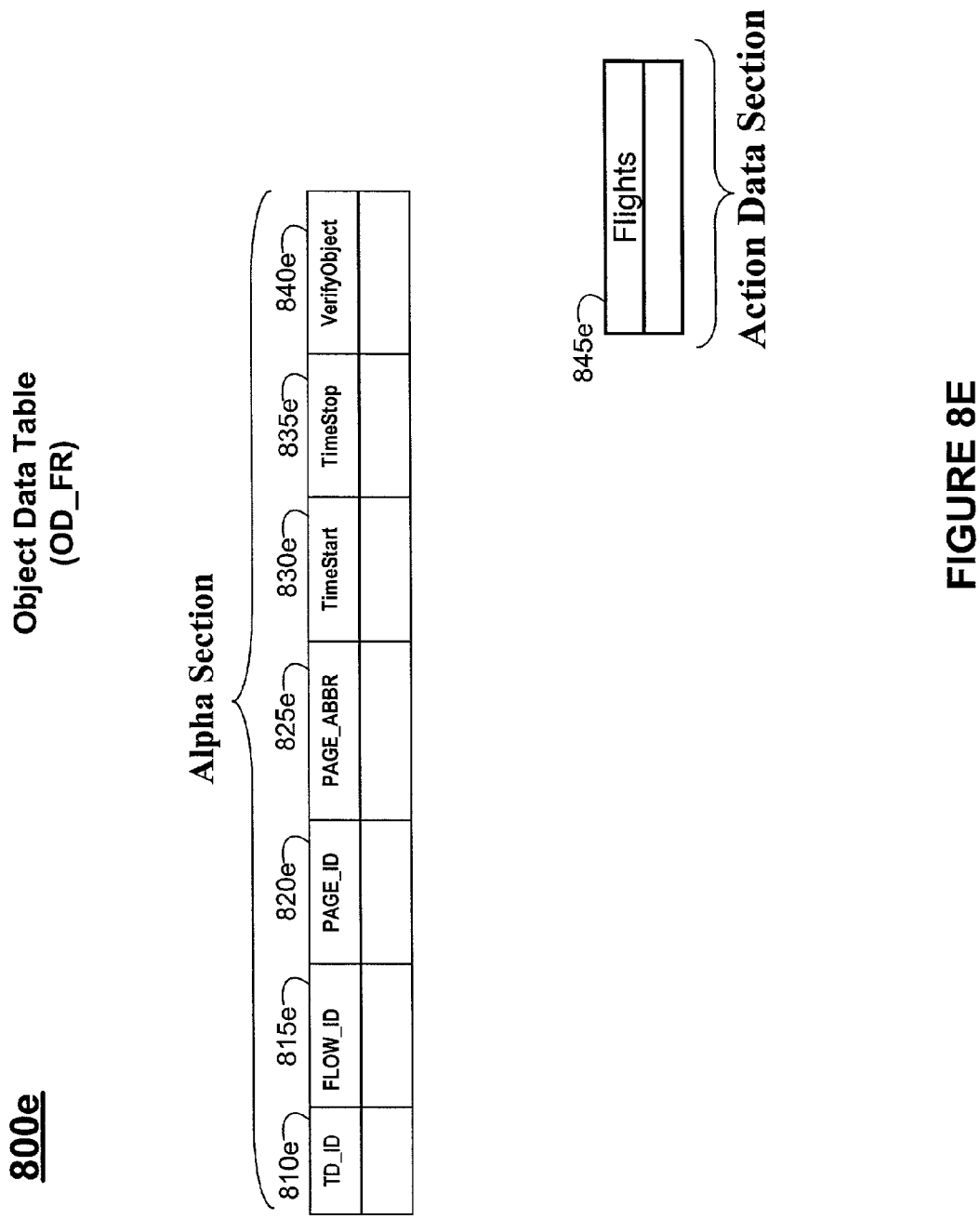
FIG. 8E is a diagram of an example of an object data table consistent with an embodiment of the present invention.

FIG. 8E is a diagram of an object data table 800e consistent with an embodiment of the present invention. As shown in FIG. 8E, and as described above, an object data table 800e may include an Alpha section and an action data section. The Alpha section of test data table 800e may include the following columns: TD_ID 810e, FLOW_ID 815e, PAGE_ID 820e, PAGE_ABBR 825e, TimeStart 830e, TimeStop 835e, and VerifyObject 840e. The columns TD_ID 810c, PAGE_ABBR 825c, TimeStart 830c, TimeStop 835c, and VerifyObject 840c may be used by, for example, scheduling component 178 to provide information related to scheduling activities.

Unique combinations of FLOW_ID 815e and PAGE_ID 820e that match FLOW_ID 820b and Page Sequence (e.g., PAGE_1–PAGE_12) columns 890b in the PAGE_FLOW table 800b may identify which row of data in the object data table 800e is to be used in initiating an action for the test case.

The action data section of an object data table 800e may include columns that match the logical names of "Action" data objects and instruct the test engine to cause the software program 185 to transition from an active window to a next window in the test case. Action data objects may include objects such as push buttons, html rectangles, etc. For example, the action data section for the Flight Reservations GUI map may include the column "Flights" 845e in object data table 800e.

FIG. 9A illustrates an exemplary Constants script 910 that may be used to define a data definition for the columns in a PAGE_FLOW table 800b in a manner consistent with the present invention. FIG. 9B illustrates an exemplary function CreatePageFlowTable 920 that may be used to create a PAGE_FLOW table 800b in a manner consistent with the present invention. Function CreatePageFlowTable 920 may use the data definition of the PAGE_FLOW table 800b provided in Constants script 910 to create the PAGE_FLOW table 800b. FIG. 9C illustrates an exemplary function CreateTD_SD_OD_Tables 930 that may be used to create a test data table 800c, a seized data table 800d, and an object data table 800e in a manner consistent with the present invention.

Constants Script 910, function CreatePageFlowTable 920, and function CreateTD_SD_OD_Tables 930 were created using the Mercury TSL scripting language. However, each may be created in any programming language that is supported by the underlying database management system.

If a user interface changes for a software program that has been set up in automation system 100, then the associated GUI map may have to change as well as one or more of the tables 240 in database 135. The GUI map may be updated to reflect the changes to the user interface by manually editing the GUI map file or by editing the GUI map by using a GUI map editor. GUI translator component 160 may be used to modify the data in one or more of the tables 240 to incorporate the user interface changes, and may also create or delete tables and/or columns in the tables.

Inputting Data for a Test Case

Figure 10:
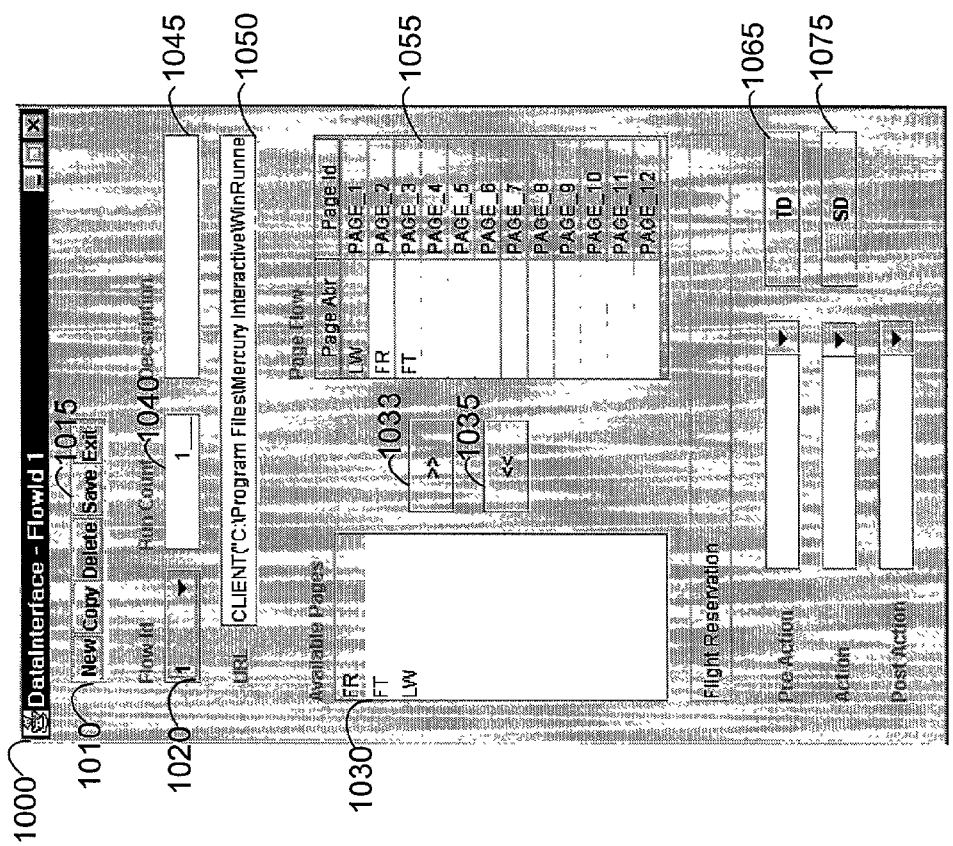
FIG. 10 illustrates an example of a data interface for creating test case data in a manner consistent with the present invention.

Once the set of tables are generated from the GUI maps 230, a user 210 may access a data input component 165 to make a request to input data for a test case into one or more of the tables 240. Data input component 165 may display a data interface 1000 to assist user 210 in creating a test case. FIG. 10 illustrates an example of a data interface 1000 in automation system 100 in a manner consistent with the present invention As shown in FIG. 10, data interface 1000 may provide for creating a new test case, copying a test case, deleting a test case, and revising a test case. To make a request to create a new test case, a user 210 may push the "New" button 1010. Data input component 165 may generate a next available sequential index for the Flow ID (if this is the first time that a test case has been created for the software program, the Flow ID will be set to 1). Data input component 165 may display the index in Flow ID 1020. Data input component 165 may initially set the Run_Count field 1040 to a default value of 1.

User 210 may enter a positive whole number value in Run Count 1040 to indicate the number of times to sequentially execute the software program for the test case. For example, user 210 enters a value of 5 in Run Count 1040 to indicate that the test case should be run five times. Alternatively, user 210 may enter a value of −1 into Run Count 1040 to indicate that the test case should run continually until an interrupt occurs. In addition, user 210 may also enter a description for the test case in the Description field 1045.

The user may enter a text string into the field URL 1050, the text string specifying a software program 185. The format of the text string may include a keyword for the launch type followed by a left parenthesis and then a file filename of the software program in quotes followed by a right parenthesis. The keyword for the launch type may include the word "CLIENT" to indicate an executable application, for example, CLIENT("C:\ProgramFiles\samples\flight\app\flight_reservation_system.exe"). A browser specific keyword may be used to indicate the type of browser 180 to invoke a software program that is a Web-based application, such as "IE" for the Microsoft Internet Explorer or "NS" for Netscape. For example, the launch type may include IE("http://www.capitalone.com") or NS("http://www.capitalone.com"). In the case of a Web-based application, the format of the text string includes a keyword for the browser type followed by a left parenthesis and then a URL in quotes followed by a right parenthesis.

After the user enters the software program 185 to launch into the field URL 1050, data input component 165 may query PAGE_ABBR table 800a for the software program to retrieve the abbreviated names of the windows being tested. Data interface 1000 may display the abbreviated names in the Available Pages list 1030. Thereafter, user 210 may set up the Page Sequence section of the PAGE_FLOW table 800b by copying page abbreviations in the Available Pages list 1030 over to the Page Flow list 1055. This may be done by highlighting the desired row(s) in the Available Pages list 1030 and then pushing the add button 1033 to copy the page abbreviations into the Page Flow list 1055 in the desired sequence. The remove button 1035 may be used to remove a selected page abbreviation from the sequence.

At this point, the user may supply data for the test data table 800c, seized data table 800d, and/or object data table 800*e* for the window that is highlighted in the Page Flow list 1055. This may be done by pushing the appropriate button, TD 1065 for the test data table or SD 1075 for the seized data table.

Figure 11:
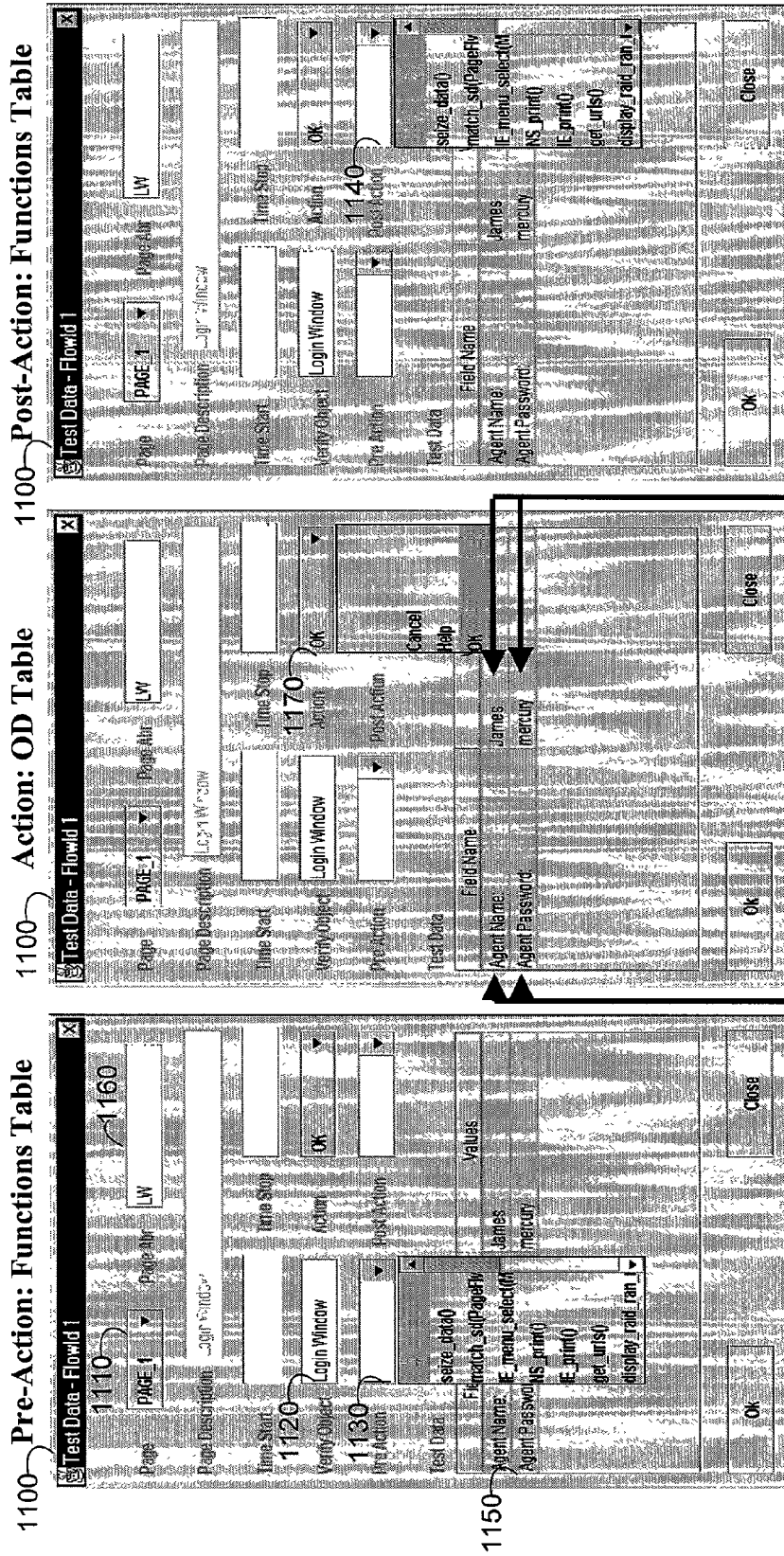
FIG. 11 illustrates an example of a user interface for defining test case data in a manner consistent with the present invention.

For example, if the user highlights the "LW" (abbreviation for Login window 300) in the Page Flow list 1055 and pushes the button TD 1065, data input component 165 displays the user interface 1100 shown in FIG. 11. Data input component 165 displays the selected Page Sequence in the Page field 1110, and selected abbreviated name of the page in the Page Abr field 1160. Data input component 165 may use the abbreviated name of the window to retrieve the logical name of the window from the PAGE_ABBR table, and may display the logical name in the Verify Object field 1120. In addition, data input component 165 may use the column headings in the action data section of the object data table 800*e* for the Login Window to generate the values for the Action list 1170. Data input component 165 may query the Function_Prototype table 700 to get a list of function prototypes for the Pre-Action 1130 and Post Action 1140 lists and may input the data into the list fields for Pre-Action 1130 and Post Action 1140.

The user may now interact with user interface 1100 to set up the data for the test data table 800*c*. For example, the user may select an Action from the Action pull down list 1170, or select a Pre Action and/or Post Action from the Pre Action 1130 or Post Action 1140 pull down lists. The user 210 may supply data for the object data table by selecting an action from the field Action 1170. The user may also supply a value for the Agent Name or Agent Password by typing the value into the appropriate row of the edit field 1150. After user 210 completes supplying data for the test data table 800*c*, user 210 may select the OK button. At this point, data input component 165 may save to memory 120 the data in user interface 1100, and return to data interface 1000.

When the user 210 pushes the SD 1075 button in the data interface 1000, data input component 165 may display user interface 1000 to the user 210 to assist the user 210 in providing test case data for the seized data table 800*d*. However, the values in user interface 1100 may include an "X" where output data is to be retrieved during execution of the software program for the test case. The "X" values change to the actual displayed data values once the software program is executed for the test case. For example, an "X" is placed in the value field for the Agent Name 1150. During execution of the software program, test engine component 170 retrieves the actual value from the test data table 800*c* for the test case and displays the actual value in the Name field of the Login Window 300.

After the user 210 completes setting up the data for the test case, the user 210 may push the "Save" button 1015 on data interface 1000 to request that the data be saved in the tables 240 for the test case. Data input component 165 may retrieve the data from data interface 1000 and may save it to memory 120. Thereafter, data input component 165 may use the data in memory 120 to insert the data into the appropriate tables 240 in database 135. As indicated above, secondary storage 130 may include database 135.

In another example, a user 210 may wish to copy an existing test case. The user 210 may access a data input component 165, which displays data interface 1000. To make a request to copy a test case, the user 210 may select from list FLOW ID 1020 a test case that the user wishes to copy, and push the "Copy" button 1010. Data input component 165 may retrieve the data for the selected test case from tables 240 based on the Flow_ID value selected from the list FLOW ID 1020, and may input the data into data interface 1000. The user may now interact with data interface 1000 as described above to make revisions to the copy of the test case. After the user 210 completes setting up the data for the copy of the test case, the user 210 may push the "Save" button 1015 to request that the data be saved in the tables 240 for the test case. Data input component 165 may retrieve the data from data interface 1000 and may save it to memory 120. Thereafter, data input component 165 may use the data in memory 120 to insert the data into the appropriate tables 240 in database 135.

Automation system 100 may provide a data import utility, which provides the ability for a user 210 to set up a test case that is to be run repeatedly while varying the test data. In many cases the test case data for this type of testing comes from external production systems. The data input utility translates single production data fields (e.g., Housing=O, R, or X) to multiple radio buttons (Own, Rent, and Other) within the targeted application window. In addition, the data input utility may import test data into database 135. For example, the data input utility may import test case data from a Microsoft Excel spreadsheet into a source table in the database 135. Another feature of the data input utility is its ability to replicate a test case as described above while importing data into database 135.

After the data is loaded into one or more of the tables 240 for testing the software program, a user 210 or a software application may make a request to test engine component 170 to execute test cases that have Run_Counts greater than zero or equal to −1.

Method for Table Driven Automated Testing of a Software Program

Figure 12:
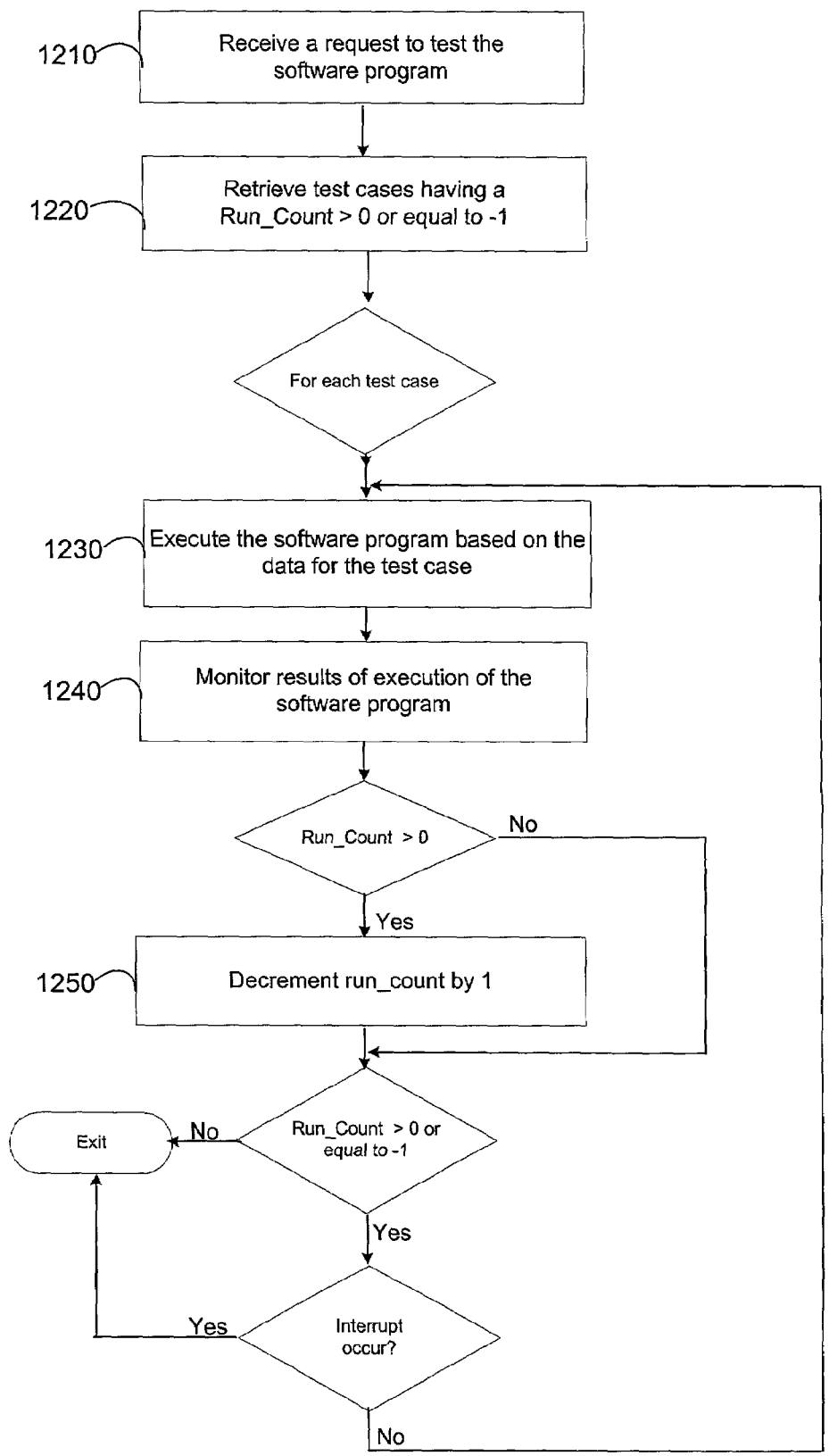
FIG. 12 is a flowchart showing a method for automatically testing a software program in a manner consistent with the present invention.

FIG. 12 is a flowchart showing an example of a method for automatically testing a software program in a manner consistent with the present invention. As shown in FIG. 12, test engine component 170 may receive a request from, for example, a user. Test engine component 165 may query PAGE_FLOW table 800*b* for test cases that have Run_Counts greater than zero or equal to −1, and may retrieve the launch_APPL value, Flow_ID, and Page Sequence data for each of the test cases having a Run_Count value greater than zero or equal to −1 (stage 1220). The retrieved data may be stored in memory 120.

For each of the retrieved test cases, test engine component 170 may launch the software program 185 based on the launch type keyword and the filename of the software program in the Launch_APPL value and display the active window (stage 1230). If test engine component 170 detects a failure condition in processing a test case, then such failure may cause the processing of the test case to terminate, and test engine component 170 proceeds to test the program for the next test case, if any.

Test engine component 170 may loop through each window found in the Page Sequence section and, for each window, may clear the data in the test data table 800*c* for the fields TimeStart 830*c*, TimeStop 835*c*, and VerifyObject 840*c* associated with the test case. In addition, test engine component 170 may retrieve the logical name of the window from the FULL_NAME field 820*a* of the PAGE_ABBR table 800*a* based on the Page Sequence data of the active window. Test engine component 170 may also retrieve the input data from test data table 800*c* based on the Flow_ID and Page Sequence data of the active window. Test engine component 170 may store the retrieved input data in memory 120. In the first iteration of the loop, the active window may be the entry in the PAGE_1 field 890*b* of the PAGE_FLOW table 800*b*. For subsequent iterations of the loop, the active window may be the next window in the sequence specified in the Page Sequence section.

Test engine component 170 may also read into memory 120 the GUI map 230 associated with the active window. Test engine component 170 may call an appropriate software controller component 173 function to load the input data into the corresponding objects on the active window. For example, test engine component 170 may locate in the GUI map the object on the active window for which the data is to be supplied, and, based on the class type, call an appropriate software controller component 173 function to place the input data into the corresponding object on the active window. For example, if the input data is associated with a list object, test engine component 170 may call a list_select_item function and specify which item in the list is to be selected. When a radio button or check button is to be pushed, test engine component 170 may call a radio_button_press or check_button function. When test data is to be entered into a text field, test engine component 170 may call an insert_text function. Software controller component 173 may transmit an appropriate instruction to the software program 185 to input the data into the object and may return the result of the processing of the instruction by the software program 185 to test engine component 170.

Test engine component 170 may verify that the action objects specified in the action data section of the object data table 800*e* exist on the active window. Further, test engine component 170 may update the data in the seized data section of the seized data table 800*d* for the active window associated with the test case. In addition, test engine component 170 may update the data in the field TimeStart 830*c* of the test data table 800*c*.

If a Pre-action is specified for an action in the test_data table 800*c*, test engine component 170 may call a ProcessPreandPostActionSwitch function to format any arguments required by the actual function in a PreandPostAction library, and may initiate the function associated with the Pre-action. Thereafter, test engine component 170 may call an appropriate software controller component 173 function to perform the action based on the action object and the object class definition of the action object in the appropriate GUI map. For example, when the action indicates that a button is to be pushed, test engine component 170 calls a button_press function to process the action associated with pushing the button. Software controller component 173 may transmit an appropriate instruction to the software program 185 to push the button specified by the action, and may return the result of the action from the software program to test engine component 170.

If a Post-action is specified for an action in the test data table 800*c*, test engine component 170 may call the ProcessPreandPostActionSwitch function to format any arguments required by the actual function in the PreandPostAction library, and may initiate the function associated with the Post-action. Thereafter, test engine component 170 may update the value in the field TimeStop 835*c* of the test data table 800*c* for the active window and test case to include the time in which the Post-action was invoked.

Test engine component 170 may monitor results of execution of the software program processing of each window in the test case (stage 1240). For each iteration of the test case loop, the Run_Count is checked to see if it is greater than zero. If Run_Count is greater than zero, then it is decremented by one (stage 1250). If Run_Count becomes equal to zero, processing for the test case ends. If Run_Count is equal to −1 for a test case, then the test case is executed continually until test engine component 170 detects an interrupt condition, at which point processing of the test case ends. An interrupt condition may occur, for example, by a user 210 through a keystroke that generates an interrupt signal, a device such as a printer to indicate that some event has occurred, or the software program in response to encountering a trap or an exception during execution of the software program.

While monitoring the results of the execution of the program, test engine component 170 may generate a text-based log file, and store information about the results of the execution. The results of the execution may include information about windows, GUI map for each window, objects on the window, Actions that were taken, a status of whether the test case passed or failed, TimeStart and TimeStop for a window action, etc. Test engine component 170 may store information about the results in a TraceLog file. FIG. 13 illustrates an example of a TraceLog file for storing results of the execution of a software program for a test case in a manner consistent with the present invention. Test engine component 170 may create a TraceLog file each time it is invoked.

In addition, test engine component 170 may create a daily trace activity log and store in it result information about captured transition times (or time that it takes to move from one window to another). FIG. 14 illustrates an example of a daily trace activity log for storing detailed result information about transition times of the execution of a software program for a test case in a manner consistent with the present invention.

Further, test engine component 170 may create a date file log and store in it result information about transition times, such as information about how long it takes for a browser to come up, how long it takes from the time an action button is pushed on one window to bring up a next window. FIG. 15 illustrates an example of a date file log for storing result information about timestamps for transition times of the execution of a software program for a test case in a manner consistent with the present invention.

Test engine component 170 may generate one or more reports from the results of the execution, and may print the reports. In addition, test engine component 170 may display the log files and may print them.

Finally, a scheduling component 178 may be included in memory 120. Scheduling component 178 may allow a user 210 to specify a test case that the user 210 desires to run at a specified time and to provide a Run_Count for the test case. At the specified time, scheduling component 178 may reset Run_Count to zero for all the test cases in the PAGE_FLOW table. Thereafter, scheduling component 178 may set the Run_Count to the user specified value for the specified test case. Next, scheduling component 178 may execute test engine program 170 to test the software program, based on the test case, in a manner as described above in FIG. 12.

Utilities for Table Driven Automated Testing of a Software Program

Automation System 100 may include a set of utilities 175, including a page flow logic utility, object coverage utility, and a data dictionary verification utility. A page flow logic utility may be run to verify the uniqueness and correctness of the FLOW_ID and PAGE_ID pointers in the tables 240 prior to testing a software program.

An object coverage utility is used to verify that all the windows, data inputs and action objects defined in the tables

240 have been used in at least one test case. This utility generates an Object Coverage Report, which includes information about defined objects that have not been used in at least one test case.

One problem with test automation, wherein multiple developers may be working on a software program, is keeping object names standard. One solution for this problem is to establish a Data Dictionary. The data dictionary is a repository for logical object names and their definitions. The data dictionary may be built into a new table in database 135 or in a text file. A data dictionary verification utility may access a Data Dictionary index that has information about all the objects in the data dictionary. The data dictionary verification utility may generate an Object Discrepancy Report using a Data Dictionary Verification script. The script matches objects in the tables 240 with object information contained in the index. Unmatched objects may be printed out in a report that lists objects that do not exist in the tables or in the index.

CONCLUSION

Accordingly, systems and methods consistent with the present invention provide table driven automation testing of software programs to alleviate, at least in part, the aforementioned disadvantages of conventional systems.

Other embodiments consistent with the invention will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method executing on a computer system for translating one or more user interface maps into a set of tables to facilitate testing of a software program, the method comprising:

receiving a request to translate a user interface map into a set of tables, wherein the request includes a filename for the software program;

retrieving a list of user interface map files that exist in a directory specified by the filename; and creating the set of tables based on the retrieved list of the user interface map files, wherein creating includes:

determining whether a first group of tables exist in a database, creating the first group of tables based on a determination that they do not exist in the database, and for each of the user interface map files in the retrieved list:

determining whether a second group of tables exist in the database, and creating the second group of tables based on a determination that they do not exist in the database.

2. The method of claim 1, wherein the first group of tables includes information identifying a sequence for activating user interfaces in the software program.

3. The method of claim 2, wherein the information identifying the sequence for activating user interfaces includes information identifying a test case, and a launch application value for launching the software program.

4. The method of claim 2, wherein the first group of tables further includes information about names for the user interfaces.

5. The method of claim 1, wherein the second group of tables includes a first data table including a first information for placing data into an object on the user interface, a second table including a second information that identifies objects of interest for recording their value during execution of the software program, and a third table including a third information for invoking an object that causes the software program to transition from an active user interface to a next user interface.

* * * * *